United States Patent
Yang et al.

(10) Patent No.: US 12,524,253 B2
(45) Date of Patent: Jan. 13, 2026

(54) PAGE CONFIGURATION METHOD, PAGE CONFIGURATION SYSTEM, ELECTRONIC DEVICE, AND READABLE STORAGE MEDIUM

(71) Applicant: BOE TECHNOLOGY GROUP CO., LTD., Beijing (CN)

(72) Inventors: Mingming Yang, Beijing (CN); Haixia Zhao, Beijing (CN); Yong Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 191 days.

(21) Appl. No.: 18/284,141

(22) PCT Filed: Jan. 9, 2023

(86) PCT No.: PCT/CN2023/071282
§ 371 (c)(1),
(2) Date: Sep. 26, 2023

(87) PCT Pub. No.: WO2023/142998
PCT Pub. Date: Aug. 3, 2023

(65) Prior Publication Data
US 2024/0160454 A1 May 16, 2024

(30) Foreign Application Priority Data
Jan. 27, 2022 (CN) .......................... 202210099869.0

(51) Int. Cl.
*G06F 9/451* (2018.01)

(52) U.S. Cl.
CPC .................. *G06F 9/451* (2018.02)

(58) Field of Classification Search
CPC ................................ G06F 9/451; G06F 9/453
See application file for complete search history.

(56) References Cited

U.S. PATENT DOCUMENTS

| 7,571,391 | B2 * | 8/2009 | Roessler ............. G06F 16/9577 |
| | | | 715/764 |
| 11,288,082 | B1 * | 3/2022 | Phoutchanthavongsa ................... |
| | | | G06F 3/0483 |

(Continued)

FOREIGN PATENT DOCUMENTS

| CN | 110096277 A | 8/2019 |
| CN | 111061978 A | 4/2020 |

(Continued)

*Primary Examiner* — Tadesse Hailu
(74) *Attorney, Agent, or Firm* — WHDA, LLP

(57) ABSTRACT

The present disclosure provides a page configuration method, a page configuration system, an electronic device and a readable storage medium. The page configuration method includes: generating, by the control device, a visualized configuration page; obtaining, by the control device, a display state of a control in the configuration page; generating, by the control device, a control parameter in accordance with the display state, the control parameter including a distance between the display position of the control and each boundary of the configuration page, and a ratio of the display size to a size of the configuration page; transmitting, by the control device, the control parameter to the terminal device; and determining, by the terminal device, a display state of the control in the terminal device in accordance with a display parameter of the terminal device and the control parameter.

16 Claims, 4 Drawing Sheets

(56) References Cited

U.S. PATENT DOCUMENTS

| | | | |
|---|---|---|---|
| 2008/0141161 A1* | 6/2008 | Raven | G06F 3/0483 |
| | | | 715/777 |
| 2010/0058185 A1* | 3/2010 | Commarford | G06F 9/453 |
| | | | 715/708 |
| 2017/0123642 A1* | 5/2017 | Raveh | G06F 9/451 |
| 2017/0131853 A1* | 5/2017 | Keller | G06F 3/0653 |
| 2017/0131883 A1* | 5/2017 | Raveh | G06F 3/04847 |
| 2018/0121044 A1* | 5/2018 | Watkins | G06F 8/38 |
| 2020/0357007 A1 | 11/2020 | Li | |
| 2021/0216700 A1* | 7/2021 | Li | G06F 40/103 |

FOREIGN PATENT DOCUMENTS

| | | |
|---|---|---|
| CN | 113032083 A | 6/2021 |
| CN | 113626120 A | 11/2021 |
| CN | 114489620 A | 5/2022 |

* cited by examiner

PAGE CONFIGURATION METHOD, PAGE CONFIGURATION SYSTEM, ELECTRONIC DEVICE, AND READABLE STORAGE MEDIUM

CROSS-REFERENCE TO RELATED APPLICATIONS

This application is the U.S. national phase of PCT Application No. PCT/CN2023/071282 filed on Jan. 9, 2023, which claims a priority of the Chinese patent application No. 202210099869.0 filed on Jan. 27, 2022, which is incorporated herein by reference in its entirety.

TECHNICAL FIELD

The present disclosure relates to the field of computer technology, in particular to a page configuration method, a page configuration system, an electronic device, and a readable storage medium.

BACKGROUND

Visual editor is used to configure a dynamic page from a User Interface (UI) in a code-free, simple and efficient manner, and a developer only needs to develop a basic page panel so as to provide a product more efficiently.

SUMMARY

In one aspect, the present disclosure provides in some embodiments a page configuration method for a page configuration system, the page configuration system including a control device and a terminal device in communication with the control device, the page configuration method including: generating, by the control device, a visualized configuration page; obtaining, by the control device, a display state of a control in the configuration page, the display state including a display position and a display size of the control; generating, by the control device, a control parameter in accordance with the display state, the control parameter including a distance between the display position of the control and each boundary of the configuration page, and a ratio of the display size to a size of the configuration page; transmitting, by the control device, the control parameter to the terminal device; and determining, by the terminal device, a display state of the control in the terminal device in accordance with a display parameter of the terminal device and the control parameter.

In another aspect, the present disclosure provides in some embodiments a page configuration method for a control device in a page configuration system, the page configuration system including the control device and a terminal device in communication with the control device, the page configuration method including: generating a visualized configuration page; obtaining a display state of a control in the configuration page; generating a control parameter in accordance with the display state, the control parameter including a distance between a display position of the control and each boundary of the configuration page, and a ratio of a display size to a size of the configuration page; and transmitting the control parameter to the terminal device so that the terminal device determines a display state of the control in the terminal device in accordance with a display parameter of the terminal device and the control parameter.

In a possible embodiment of the present disclosure, the control includes a first control and a second control, and prior to obtaining the display state of the control in the configuration page, the page configuration method further includes: in the case that a display instruction for displaying the second control on the configuration page has been received, obtaining a first coordinate parameter, the first coordinate parameter being determined in accordance with a position of the first control on the configuration page or a preset reference position on the configuration page; determining a second coordinate parameter of the second control in accordance with an adjustment instruction for the second control; updating the second coordinate parameter with a target coordinate parameter in the first coordinate parameter in the case that a difference between the target coordinate parameter and a corresponding second coordinate parameter is less than a preset difference threshold; and updating a position of the second control in accordance with the updated second coordinate parameter.

In a possible embodiment of the present disclosure, the preset reference position includes a plurality of reference mark lines.

In a possible embodiment of the present disclosure, subsequent to generating the control parameter in accordance with the display state, the page configuration method further includes: obtaining attribute information about the control, the attribute information including at least one of a binding relationship between the control and a functional interface and a correspondence between the control and a control event; and adding the attribute information about the control into the control parameter.

In a possible embodiment of the present disclosure, the control parameter is stored in a json file.

In yet another aspect, the present disclosure provides in some embodiments a page configuration method for a terminal device in a page configuration system, the page configuration system including a control device and the terminal device in communication with the control device, the page configuration method including: receiving a control parameter from the control device, the control parameter being generated by the control device in accordance with a display state of a control in a configuration page, and the control parameter including a distance between a display position of the control and each boundary of the configuration page, and a ratio of a display size to a size of the configuration page; and determining a display state of the control in the terminal device in accordance with a display parameter of the terminal device and the control parameter.

In a possible embodiment of the present disclosure, the determining the display state of the control in the terminal device in accordance with the display parameter of the terminal device and the control parameter includes: obtaining the display parameter of the terminal device, the display parameter including a size of a display interface of the terminal device; calculating a display size of the control in the terminal device in accordance with the display parameter and the control parameter, a first display ratio of the control being equal to a second display ratio of the control, the first display ratio being a ratio of the display size of the control in the display interface to the size of the display interface, and the second display ratio being a ratio of the display size of the control in the configuration page to the size of the configuration page; calculating a display position of the control in the terminal device in accordance with the display parameter and the control parameter, a third display ratio of the control being equal to a fourth display ratio of the control, the third display ratio being a ratio of a first distance to a second distance, the first distance being a distance between the control and a boundary of the display interface, the second distance being the size of the display interface, the fourth display ratio being a ratio of a third distance to a fourth distance, the third distance being a distance between the control and the boundary of the configuration page, and the second distance being the size of the configuration page; and generating the display state of the control in the terminal device, the display state of the control in the terminal device including the display size and the display position of the control in the terminal device.

In still yet another aspect, the present disclosure provides in some embodiments a page configuration system, including a control device and a terminal device in communication with the control device. The control device is configured to: generate a visualized configuration page; obtain a display state of a control in the configuration page, the display state including a display position and a display size of the control; generate a control parameter in accordance with the display state, the control parameter including a distance between the display position of the control and each boundary of the configuration page, and a ratio of the display size to a size of the configuration page; and transmit the control parameter to the terminal device. The terminal device is configured to determine a display state of the control in the terminal device in accordance with a display parameter of the terminal device and the control parameter.

In still yet another aspect, the present disclosure provides in some embodiments an electronic device including a memory, a processor, and a program stored in the memory and executed by the processor. The processor is configured to read the program in the memory so as to implement the above-mentioned method.

In still yet another aspect, the present disclosure provides in some embodiments a readable storage medium storing therein a program. The program is executed by a processor so as to implement the above-mentioned method.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
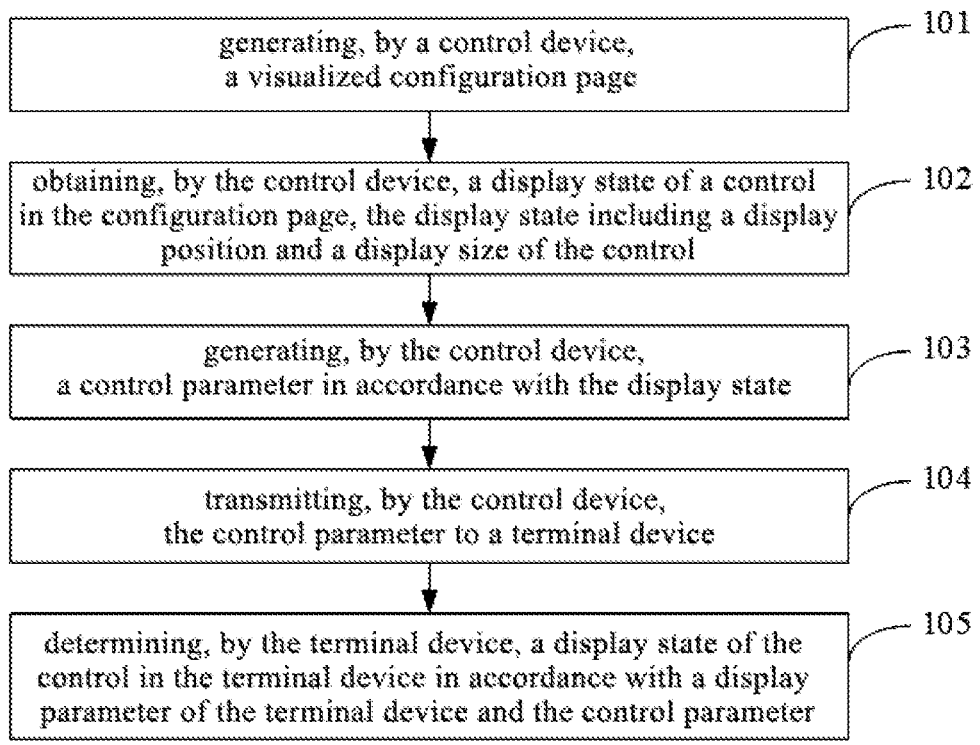
FIG. 1 is a flow chart of a page configuration method according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C.

The present disclosure provides in some embodiments a page configuration method for a page configuration system, and the page configuration system includes a control device 12 and a terminal device 11 in communication with the control device 12.

In the embodiments of the present disclosure, the control device refers to a server, a network side device or an upper computer. Configuration information about a page is generated when the upper computer is operated by an operator, and then issued to the terminal device. The terminal device configures a corresponding page in accordance with the received configuration information. In this way, it is able for the control device to control the terminal device to configure the page on the terminal device.

As shown in FIG. 1, in the embodiments of the present disclosure, the method includes the following steps.

Step 101: generating, by the control device 12, a visualized configuration page.

In the embodiments of the present disclosure, the page is configured in a visual manner, and the configuration page is created on the control device 12 at first.

Figure 2:
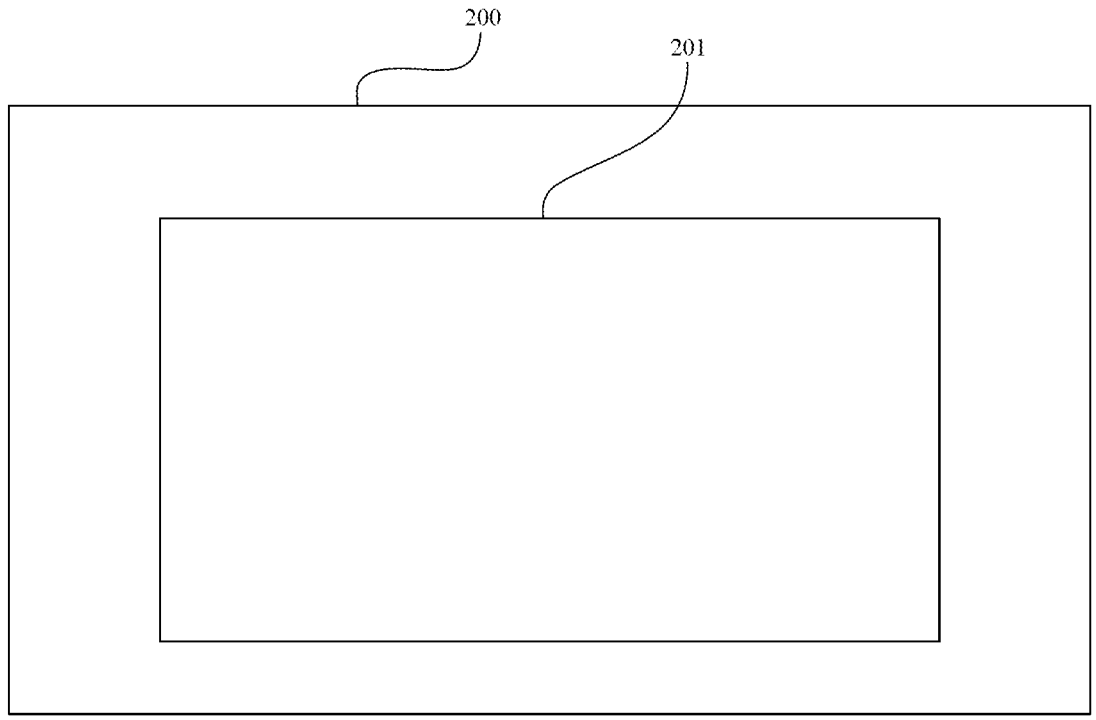
FIG. 2 is a schematic view showing a target device and a virtual device according to one embodiment of the present disclosure.

As shown in FIG. 2, in a possible embodiment of the present disclosure, an editing interface 200 is opened and a configuration page 201 is created on the editing interface 200. During the implementation, such elements of the configuration page 201 as size, resolution and background image may be set according to the practical needs.

Step 102: obtaining, by the control device 12, a display state of a control in the configuration page, the display state including a display position and a display size of the control.

Next, the control 202 is visually added on the configuration page 201. In the embodiments of the present disclosure, a list of controls is provided, and the control 202 is added by the operator on the configuration page 201 through selecting the control in the list of controls.

After the control 202 has been added, a position and a size of the control 202 is further adjusted. In the embodiments of the present disclosure, coordinates of the control 202 is inputted. To simplify the operation, in some embodiments of the present disclosure, the control 202 is dragged by the operator directly on the configuration page 201 so as to adjust the position of the control 202.

Figure 3:
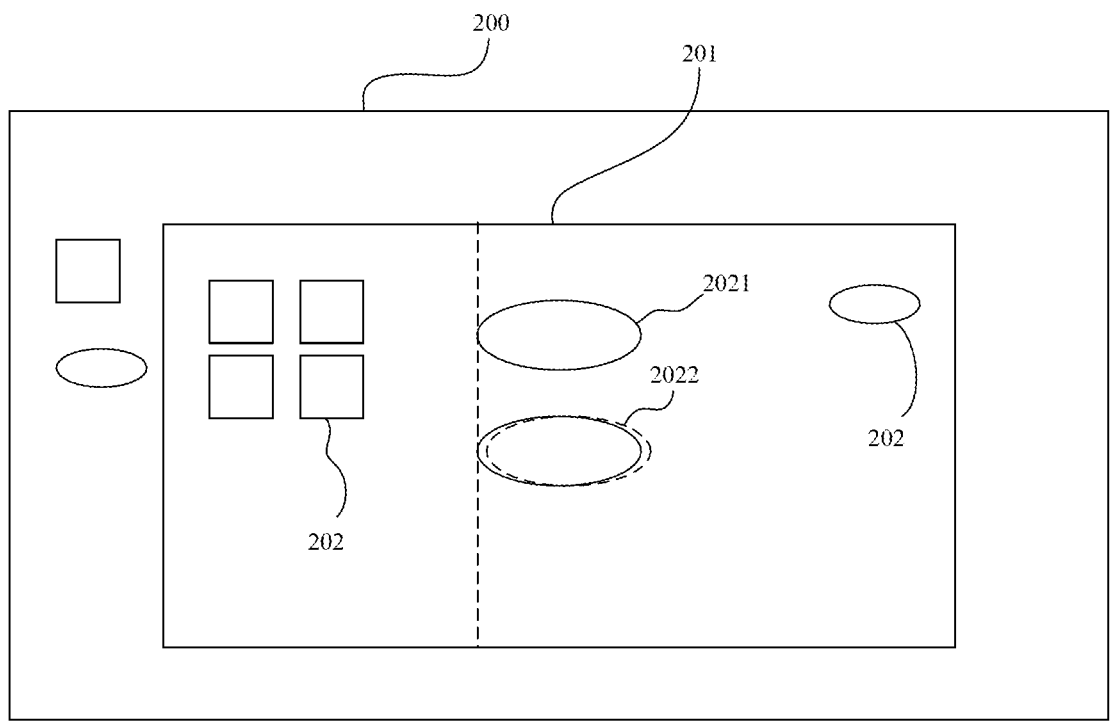
FIG. 3 is a schematic view showing a communication principle between the target device and the virtual device according to one embodiment of the present disclosure.

As shown in FIG. 3, in some embodiments of the present disclosure, the control 202 is displayed in a blank region of the editing interface 200. The control 202 is dragged by the operator into a corresponding region of the configuration page 201 so as to add the control 202 on the configuration page, and dragged out of the corresponding region of the configuration page 201 so as to delete the control 202 on the configuration page 201.

Similarly, in the embodiments of the present disclosure, the control 202 is scaled up or down through inputting the size of the control or directly dragging the control.

The quantity of controls 202 is one or more, and it may be set according to the practical need, which will not be particularly defined herein.

Step 103: generating, by the control device 12, a control parameter in accordance with the display state.

After adjusting the position and size of the control 202, the control parameter is generated. During the implementation, a list of controls, i.e., a first list, is established, the quantity of elements in the first list is the same as the quantity of controls 202, one element corresponds to one control 202, and information about each element includes the control parameter of one control 202.

In the embodiments of the present disclosure, the control parameter includes a distance between the display position of the control 202 and each boundary of the configuration page 201, and a specific position of the control 202 in the configuration page 201 is determined in accordance with the distance. The control parameter further includes a ratio of the display size of the control 202 to the size of the configuration page 201, and the display size of the control 202 in the page is determined in accordance with the ratio.

Step 104: transmitting, by the control device, the control parameter to the terminal device 11.

In the embodiments of the present disclosure, the control parameter is stored in different ways. In a possible embodiment of the present disclosure, the control parameter is stored through a json file, and when the page configuration needs to be performed, the control device 12 transmits the json file to the terminal device 11.

Step 105: determining, by the terminal device 11, a display state of the control in the terminal device 11 in accordance with a display parameter of the terminal device 11 and the control parameter.

The terminal device 11 is a smart phone, a web page, etc. Different terminal devices 11 have different display parameters. Upon the receipt of the control parameter, the terminal device 11 determines the display state of the control 202 in the terminal device 11 in conjunction with its display parameter, and configures the page in accordance with the display state of the control 202. In this way, it is able to configure and display the page in a better manner in accordance with its display parameter.

In some embodiments of the present disclosure, the position of control 202 is further adjusted automatically. The controls 202 include a first control 2021 and a second control 202. Prior to step 102, the method further includes: upon the receipt of a display instruction for displaying the second control on the configuration page, obtaining a first coordinate parameter; determining a second coordinate parameter of the second control in accordance with an adjustment instruction for the second control; updating the second coordinate parameter with a target coordinate parameter in the first coordinate parameter in the case that a difference between the target coordinate parameter and a corresponding second coordinate parameter is less than a preset difference threshold; and updating a position of the second control in accordance with the updated second coordinate parameter.

In the embodiments of the present disclosure, the first coordinate parameter is determined in accordance with a position of the first control 2021 on the configuration page 201, or a preset reference position on the configuration page 201.

As shown in FIG. 3, it should be appreciated that, in a possible embodiment of the present disclosure, when the second control 2022 needs to be added to the configuration page 201 and the first control 2021 already exists on the configuration page 201, the first coordinate parameter is determined in accordance with the first control 2021 so as to adjust the position of the second control 2022. In another possible embodiment of the present disclosure, the preset reference position is provided on the configuration page 201. Illustratively, in some embodiments of the present disclosure, the preset reference position includes a plurality of reference mark lines, and the first coordinate parameter is determined based on a position of the reference mark line so as to adjust the position of the second control 2022.

When the second control 2022 is to be added, the first coordinate parameter and the second coordinate parameter are obtained, and the first coordinate parameter refers to coordinates of the first control 2021 or the preset reference position.

In the embodiments of the present disclosure, the target coordinate parameter is coordinates of a leftmost portion of the first control 2021. When the second control 2022 is added, the coordinates of the leftmost portion of the first control 2021 are obtained as the target coordinate parameter.

After obtaining the adjustment instruction for the second control 2022, the size and position of the second control 2022 are adjusted, and then coordinates of a leftmost portion of the second control 2022 are determined as the second coordinate parameter.

As shown in FIG. 3, the obtained target coordinate parameter is compared with the second coordinate parameter. When the difference between the two is less than a certain preset difference threshold, it means that the leftmost portion of the first control 2021 is very close to that of the second control 2022. At this time, the second coordinate parameter is updated with the target coordinate parameter, so that the coordinates of the leftmost portion of the second control 2022 are the same as the coordinates of the leftmost portion of the first control 2021, i.e., the leftmost portion of the first control 2021 is aligned with the leftmost portion of the second control 2022 and the second control 2022 is adjusted from a position indicated by a dotted line to a position indicated by a solid line.

During the implementation, a second list including coordinates of the preset reference position is established, and then the obtained second coordinate parameter is compared with each value in the first list or the second list to determine whether to adjust the position of the second control 2022. When updating the position of the second control 2022, specifically, a numerical value corresponding to the coordinates of the second control 2022 in the first list is updated, so as to adjust the position of the second control 2022.

The preset difference threshold is set according to the practical need, e.g., 1 mm, 2 mm or 3 mm.

During the implementation, each of the target coordinate parameter and the second coordinate parameter may be coordinates of an uppermost portion, a lowermost portion, a leftmost portion, a rightmost portion, a transverse axis or a longitudinal axis of the control 202.

In this regard, when adjusting the position of the control 202, the control 202 may be automatically moved to a specific position so as to be aligned with the other control 202 or a specific reference position conveniently and quickly, thereby to facilitate the page configuration.

In some embodiments of the present disclosure, subsequent to generating the control parameter in accordance with the display state, the method further includes: obtaining attribute information about the control, the attribute information including at least one of a binding relationship between the control and a functional interface and a correspondence between the control and a control event; and adding the attribute information about the control to the control parameter.

In the embodiments of the present disclosure, the attribute information is further configured for the control 202. Specifically, the attribute information about the control is configured manually or selected in a list.

Illustratively, in a possible embodiment of the present disclosure, an input box is displayed so that a to-be-bound data source is inputted by the operator manually, and a corresponding attribute value is modified to adjust attribute information about an interface. In another possible embodiment of the present disclosure, an Application Programming Interface (API) list is displayed, and a function corresponding to the control 202 is selected in the API list. Further, a maintenance control is established so as to maintain a correspondence between the interface and the attribute, thereby to bind the control 202 with the corresponding interface and call the corresponding function through the control 202.

The control event refers to an event for controlling a page attribute, e.g., a page or address jump. During the implementation, the control 202 is bound with a corresponding control event, so as to trigger the control event through the control 202.

After the configuration of the page and the generation of the control parameter, a dependency library is further added to a corresponding configuration file, so as to achieve a corresponding function normally, thereby to perform the compilation normally.

Finally, relevant parameters of the control 202 in the configuration page 201, e.g., the position, size and attribute information, are stored to generate the control parameter. For example, these parameters are written into a same json file as the control parameter. Furthermore, the control parameter is transmitted to a server and then forwarded by the server to the terminal device 11. Obviously, the control parameter may also be transmitted to the terminal device 11 directly through the control device 12.

In some embodiments of the present disclosure, the determining the display state of the control in the terminal device in accordance with the display parameter of the terminal device and the control parameter includes: obtaining the display parameter of the terminal device; calculating a display size of the control in the terminal device in accordance with the display parameter and the control parameter; calculating a display position of the control in the terminal device in accordance with the display parameter and the control parameter; and generating the display state of the control in the terminal device, the display state of the control in the terminal device including the display size and the display position of the control in the terminal device.

In the embodiments of the present disclosure, the display parameter of the terminal device includes a size of a display interface of the terminal device, specifically in the form of resolution.

It should be appreciated that, the quantity of terminal devices 11 is plural, and different terminal devices 11 have different display parameters, so it is necessary to further determine the display size of the control 202 in each terminal device 11.

In the embodiments of the present disclosure, the display position and the display size of the control 202 in the terminal device 11 need to be determined.

In the embodiments of the present disclosure, a first display ratio of the control 202 is equal to a second display ratio of the control 202. The first display ratio refers to a ratio of a display size of the control 202 in the display interface to a size of the display interface, and the second display ratio refers to a ratio of a display size of the control 202 in the configuration page 201 to a size of the configuration page 201.

Illustratively, when a ratio of a transverse length of the control 202 in the configuration page 201 to a transverse length of the configuration page 201 is 1:5, a ratio of a transverse display size of the control 202 in the display interface of the terminal device 11 to a transverse length of the display interface of the terminal device 11 is also 1:5. When the first display ratio and the second display ratio in each direction are equal, the display ratio of the control 202 in the configuration page 201 may be the same as the display ratio of the control 202 in the terminal device 11.

A third display ratio of the control 202 is equal to a fourth display ratio of the control 202. The third display ratio is a ratio of a first distance to a second distance, the first distance is a distance between the control 202 and a boundary of the display interface, the second distance is the size of the display interface, the fourth display ratio is a ratio of a third distance to a fourth distance, the third distance is a distance between the control 202 and the boundary of the configuration page 201, and the second distance is the size of the configuration page 201.

Illustratively, when a ratio of a distance between the control 202 and a left boundary of the configuration page 201 to the transverse length of the configuration page 201 is 1:5, a ratio of a distance between the control 202 and a left boundary of the display interface to the transverse length of the display interface is also 1:5 when the control 202 is displayed on the display interface of the terminal device 11.

In this regard, through determining the display state of the control 202 in the terminal device 11, the display state of the control 202 in the terminal device 11 is the same as that of the control 202 in configuration page 201 of the control device 12, so it is able to automatically adjust the display state of the control 202 on different terminal devices 11.

Figure 4:
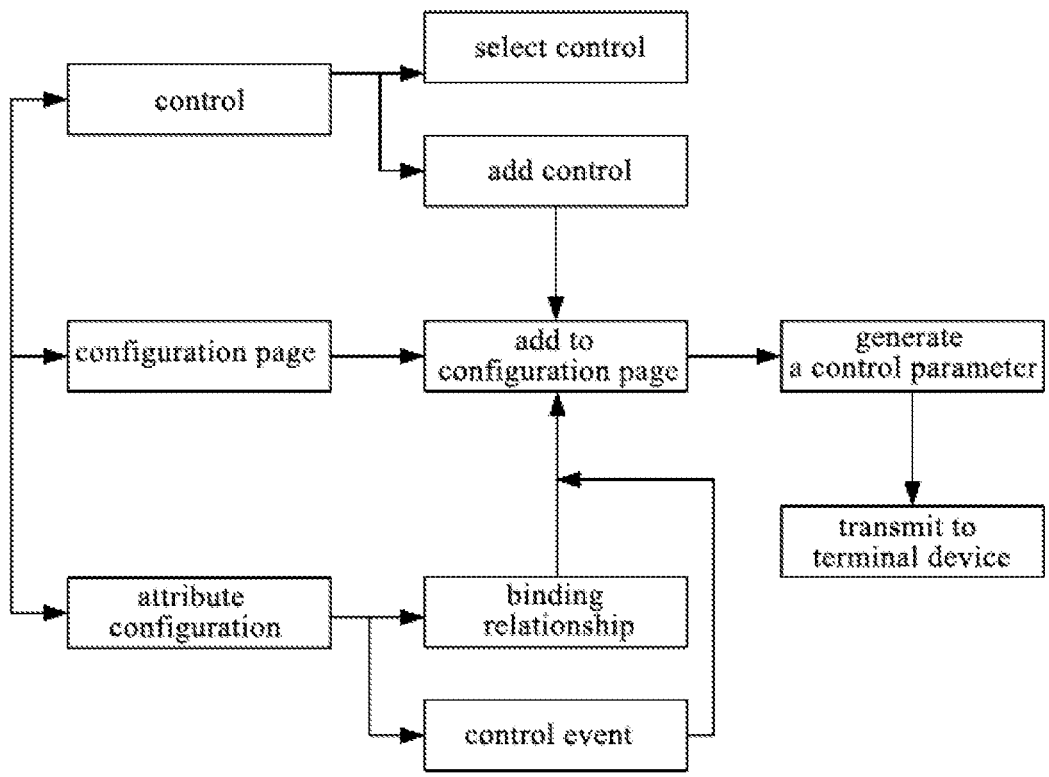
FIG. 4 is a schematic view showing a page configuration apparatus according to one embodiment of the present disclosure.

As shown in FIG. 4, at first, the configuration page is established. Next, the control is selected and added to the configuration page. Further, the attribute of the control, e.g., the binding relationship and the control event, is configured. Then, the control parameter is generated and transmitted to the terminal device, so that a corresponding page is displayed by the terminal device.

The present disclosure provides in some embodiments a page configuration method for a control device in a page configuration system. The page configuration system includes the control device and a terminal device in communication with the control device. The method includes: generating a visualized configuration page; obtaining a display state of a control in the configuration page; generating a control parameter in accordance with the display state, the control parameter including a distance between a display position of the control and each boundary of the configuration page, and a ratio of a display size to a size of the configuration page; and transmitting the control parameter to the terminal device so that the terminal device determines a display state of the control in the terminal device in accordance with a display parameter of the terminal device and the control parameter.

In a possible embodiment of the present disclosure, the control includes a first control and a second control, and prior to obtaining the display state of the control in the configuration page, the page configuration method further includes: in the case that a display instruction for displaying the second control on the configuration page has been received, obtaining a first coordinate parameter, the first coordinate parameter being determined in accordance with a position of the first control on the configuration page or a preset reference position on the configuration page; determining a second coordinate parameter of the second control in accordance with an adjustment instruction for the second control; updating the second coordinate parameter with a target coordinate parameter in the first coordinate parameter in the case that a difference between the target coordinate parameter and a corresponding second coordinate parameter is less than a preset difference threshold; and updating a position of the second control in accordance with the updated second coordinate parameter.

In a possible embodiment of the present disclosure, the preset reference position includes a plurality of reference mark lines.

In a possible embodiment of the present disclosure, subsequent to generating the control parameter in accordance with the display state, the page configuration method further includes: obtaining attribute information about the control, the attribute information including at least one of a binding relationship between the control and a functional interface and a correspondence between the control and a control event; and adding the attribute information about the control into the control parameter.

In a possible embodiment of the present disclosure, the control parameter is stored in a json file.

The implementation of the page configuration method in the embodiments of the present disclosure may refer to the implementation of the above-mentioned page configuration method for the page configuration system, which will not be particularly defined herein.

The present disclosure provides in some embodiments a page configuration method for a terminal device in a page configuration system. The page configuration system includes a control device and the terminal device in communication with the control device. The method includes: receiving a control parameter from the control device, the control parameter being generated by the control device in accordance with a display state of a control in a configuration page, and the control parameter including a distance between a display position of the control and each boundary of the configuration page, and a ratio of a display size to a size of the configuration page; and determining a display state of the control in the terminal device in accordance with a display parameter of the terminal device and the control parameter.

In a possible embodiment of the present disclosure, the determining the display state of the control in the terminal device in accordance with the display parameter of the terminal device and the control parameter includes: obtaining the display parameter of the terminal device, the display parameter including a size of a display interface of the terminal device; calculating a display size of the control in the terminal device in accordance with the display parameter and the control parameter, a first display ratio of the control being equal to a second display ratio of the control, the first display ratio being a ratio of the display size of the control in the display interface to the size of the display interface, and the second display ratio being a ratio of the display size of the control in the configuration page to the size of the configuration page; calculating a display position of the control in the terminal device in accordance with the display parameter and the control parameter, a third display ratio of the control being equal to a fourth display ratio of the control, the third display ratio being a ratio of a first distance to a second distance, the first distance being a distance between the control and a boundary of the display interface, the second distance being the size of the display interface, the fourth display ratio being a ratio of a third distance to a fourth distance, the third distance being a distance between the control and the boundary of the configuration page, and the second distance being the size of the configuration page; and generating the display state of the control in the terminal device, the display state of the control in the terminal device including the display size and the display position of the control in the terminal device.

The implementation of the page configuration method in the embodiments of the present disclosure may refer to that of the above-mentioned page configuration method for the page configuration system, which will not be particularly defined herein.

The present disclosure provides in some embodiments a page configuration system, which includes a control device and a terminal device in communication with the control device. The control device is configured to: generate a visualized configuration page; obtain a display state of a control in the configuration page, the display state including a display position and a display size of the control; generate a control parameter in accordance with the display state, the control parameter including a distance between the display position of the control and each boundary of the configuration page, and a ratio of the display size to a size of the configuration page; and transmit the control parameter to the terminal device. The terminal device is configured to determine a display state of the control in the terminal device in accordance with a display parameter of the terminal device and the control parameter.

The page configuration system in the embodiments of the present disclosure is used to implement the above-mentioned page configuration method with a same or similar technical effect, which will not be particularly defined herein.

Figure 5:
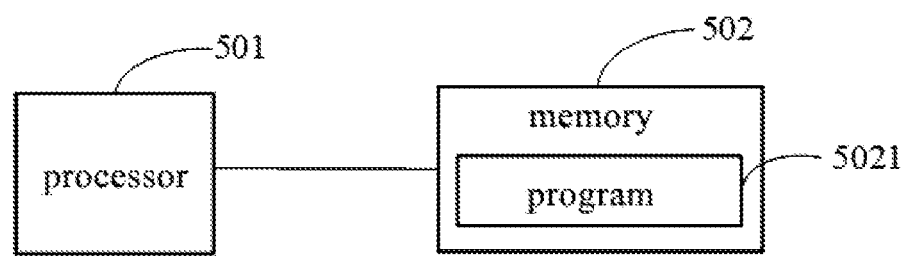
FIG. 5 is a schematic view showing an electronic device according to one embodiment of the present disclosure.
Figure 6:
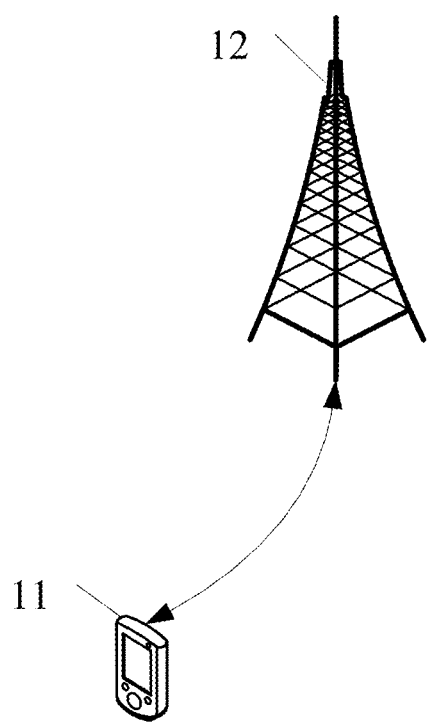
FIG. 6 is a schematic view showing a page configuration system according to one embodiment of the present disclosure.

The present disclosure further provides in some embodiments an electronic device which, as shown in FIG. 5, includes a processor 501, a memory 502, and a program 5021 stored in the memory 502 and executed by the processor 501.

The program 5021 is executed by the processor 501 so as to implement the above-mentioned method with a same beneficial effect, which will not be particularly defined herein.

It should be appreciated that, all of, or parts of, the steps may be implemented through hardware, or implemented through relevant hardware under the control of a computer program. The computer program may be stored in a readable storage medium.

The present disclosure further provides in some embodiments a readable storage medium storing therein a computer program. The computer program is executed by a processor so as to implement the above-mentioned method with a same technical effect, which will not be particularly defined herein.

The storage medium includes Read-Only Memory (ROM), Random Access Memory (RAM), magnetic disk, optical disk, etc.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A page configuration method for a page configuration system, the page configuration system comprising a control device and a terminal device in communication with the control device, the page configuration method comprising:
   generating, by the control device, a visualized configuration page;
   obtaining, by the control device, a display state of a control in the configuration page, the display state comprising a display position and a display size of the control;
   generating, by the control device, a control parameter in accordance with the display state, the control parameter comprising a distance between the display position of the control and each boundary of the configuration page, and a ratio of the display size to a size of the configuration page;
   transmitting, by the control device, the control parameter to the terminal device; and
   determining, by the terminal device, a display state of the control in the terminal device in accordance with a display parameter of the terminal device and the control parameter,
   wherein subsequent to generating, by the control device, the control parameter in accordance with the display state, the page configuration method further comprises:
   obtaining, by the control device, attribute information about the control, the attribute information comprising at least one of a binding relationship between the control and a functional interface and a correspondence between the control and a control event; and
   adding, by the control device, the attribute information about the control into the control parameter.

2. An electronic device, comprising a memory, a processor, and a program stored in the memory and executed by the processor, wherein the processor is configured to read the program in the memory so as to implement the page configuration method according to claim 1.

3. A non-transitory readable storage medium storing therein a program, wherein the program is executed by a processor so as to implement the page configuration method according to claim 1.

4. A page configuration method for a control device in a page configuration system, the page configuration system comprising the control device and a terminal device in communication with the control device, the page configuration method comprising:
   generating a visualized configuration page;
   obtaining a display state of a control in the configuration page;
   generating a control parameter in accordance with the display state, the control parameter comprising a distance between a display position of the control and each boundary of the configuration page, and a ratio of a display size to a size of the configuration page; and
   transmitting the control parameter to the terminal device so that the terminal device determines a display state of the control in the terminal device in accordance with a display parameter of the terminal device and the control parameter,
   wherein subsequent to generating the control parameter in accordance with the display state, the page configuration method further comprises:
   obtaining attribute information about the control, the attribute information comprising at least one of a binding relationship between the control and a functional interface and a correspondence between the control and a control event; and
   adding the attribute information about the control into the control parameter.

5. The page configuration method according to claim 4, wherein the control comprises a first control and a second control, wherein prior to obtaining the display state of the control in the configuration page, the page configuration method further comprises:
   in the case that a display instruction for displaying the second control on the configuration page has been received, obtaining a first coordinate parameter, the first coordinate parameter being determined in accordance with a position of the first control on the configuration page or a preset reference position on the configuration page;
   determining a second coordinate parameter of the second control in accordance with an adjustment instruction for the second control;
   updating the second coordinate parameter with a target coordinate parameter in the first coordinate parameter in the case that a difference between the target coordinate parameter and a corresponding second coordinate parameter is less than a preset difference threshold; and
   updating a position of the second control in accordance with the updated second coordinate parameter.

6. The page configuration method according to claim 5, wherein the preset reference position comprises a plurality of reference mark lines.

7. The page configuration method according to claim 4, wherein the control parameter is stored in a json file.

8. A control device in a page configuration system, comprising a memory, a processor, and a program stored in the memory and executed by the processor, wherein the processor is configured to read the program in the memory so as to implement the page configuration method according to claim 4.

9. The control device according to claim 8, wherein the control comprises a first control and a second control, wherein prior to obtaining the display state of the control in the configuration page, the processor is configured to read the program in the memory, so as to:
   in the case that a display instruction for displaying the second control on the configuration page has been received, obtain a first coordinate parameter, the first coordinate parameter being determined in accordance with a position of the first control on the configuration page or a preset reference position on the configuration page;
   determine a second coordinate parameter of the second control in accordance with an adjustment instruction for the second control;
   update the second coordinate parameter with a target coordinate parameter in the first coordinate parameter in the case that a difference between the target coordinate parameter and a corresponding second coordinate parameter is less than a preset difference threshold; and
update a position of the second control in accordance with the updated second coordinate parameter.

10. The control device according to claim 9, wherein the preset reference position comprises a plurality of reference mark lines.

11. The control device according to claim 8, wherein the control parameter is stored in a json file.

12. A non-transitory readable storage medium storing therein a program, wherein the program is executed by a processor so as to implement the page configuration method according to claim 4.

13. The non-transitory readable storage medium according to claim 12, wherein the control comprises a first control and a second control, wherein prior to obtaining the display state of the control in the configuration page, the processor is configured to read the program so as to:
in the case that a display instruction for displaying the second control on the configuration page has been received, obtain a first coordinate parameter, the first coordinate parameter being determined in accordance with a position of the first control on the configuration page or a preset reference position on the configuration page;
determine a second coordinate parameter of the second control in accordance with an adjustment instruction for the second control;
update the second coordinate parameter with a target coordinate parameter in the first coordinate parameter in the case that a difference between the target coordinate parameter and a corresponding second coordinate parameter is less than a preset difference threshold; and
update a position of the second control in accordance with the updated second coordinate parameter.

14. A page configuration method for a terminal device in a page configuration system, the page configuration system comprising a control device and the terminal device in communication with the control device, the page configuration method comprising:
receiving a control parameter from the control device, the control parameter being generated by the control device in accordance with a display state of a control in a configuration page, and the control parameter comprising a distance between a display position of the control and each boundary of the configuration page, and a ratio of a display size to a size of the configuration page; and
determining a display state of the control in the terminal device in accordance with a display parameter of the terminal device and the control parameter,
wherein the determining the display state of the control in the terminal device in accordance with the display parameter of the terminal device and the control parameter comprises:
obtaining the display parameter of the terminal device, the display parameter comprising a size of a display interface of the terminal device;
calculating a display size of the control in the terminal device in accordance with the display parameter and the control parameter, a first display ratio of the control being equal to a second display ratio of the control, the first display ratio being a ratio of the display size of the control in the display interface to the size of the display interface, and the second display ratio being a ratio of the display size of the control in the configuration page to the size of the configuration page;
calculating a display position of the control in the terminal device in accordance with the display parameter and the control parameter, a third display ratio of the control being equal to a fourth display ratio of the control, the third display ratio being a ratio of a first distance to a second distance, the first distance being a distance between the control and a boundary of the display interface, the second distance being the size of the display interface, the fourth display ratio being a ratio of a third distance to a fourth distance, the third distance being a distance between the control and the boundary of the configuration page, and the second distance being the size of the configuration page; and
generating the display state of the control in the terminal device, the display state of the control in the terminal device comprising the display size and the display position of the control in the terminal device.

15. A terminal device in a page configuration system, comprising a memory, a processor, and a program stored in the memory and executed by the processor, wherein the processor is configured to execute the program in the memory, so as to implement the page configuration method according to claim 14.

16. A non-transitory storage medium storing therein a program, wherein the program is executed by a processor so as to implement the page configuration method according to claim 14.

* * * * *